United States Patent
Okada

[11] 3,730,048
[45] May 1, 1973

[54] SCREW WITH A HEAD LOOKING LIKE A TRUE CIRCLE

[76] Inventor: Jujiro Okada, No. 69, Chodo-1-chome, Higashi-Osaka City, Japan

[22] Filed: May 25, 1971

[21] Appl. No.: 146,623

[30] Foreign Application Priority Data

June 11, 1970 Japan...........................45/50925

[52] U.S. Cl..................................................85/45
[51] Int. Cl.............................................F16b 23/00
[58] Field of Search ................85/45, 9 R, 61, 32 R; 145/50 R

[56] References Cited

UNITED STATES PATENTS

| 1,684,096 | 9/1928 | Hughes | 85/45 UX |
| 3,354,757 | 11/1967 | Grimm et al | 85/45 X |
| 3,369,441 | 2/1968 | Kosar | 85/45 |

*Primary Examiner*—Ramon S. Britts
*Attorney*—Wenderoth, Lind & Ponack

[57] ABSTRACT

A screw with a head looking like a true circle. This appearance is achieved by forming the circumference of the top surface of a screw head into a true circle and forming the periphery of the screw head which immediately follows said true circle of the top surface into an oval. The oval consists of a short diameter being approximately the same as the diameter of the true circle of the top surface and a long diameter being slightly longer than the diameter of the top surface.

1 Claim, 7 Drawing Figures

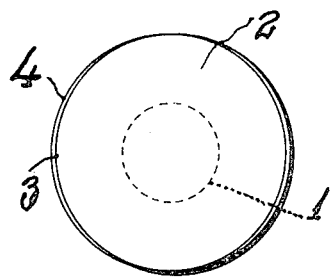
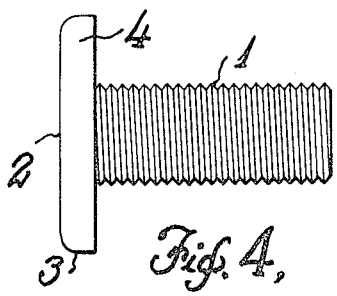
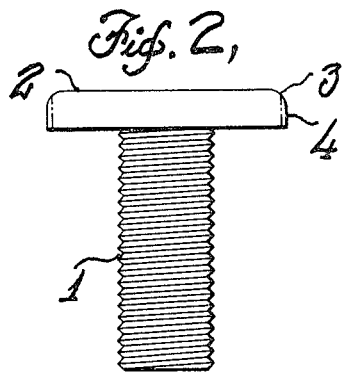
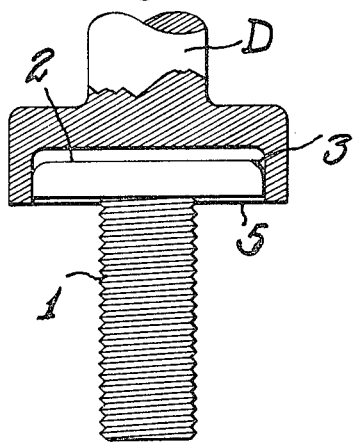
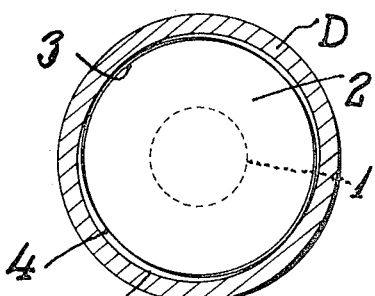
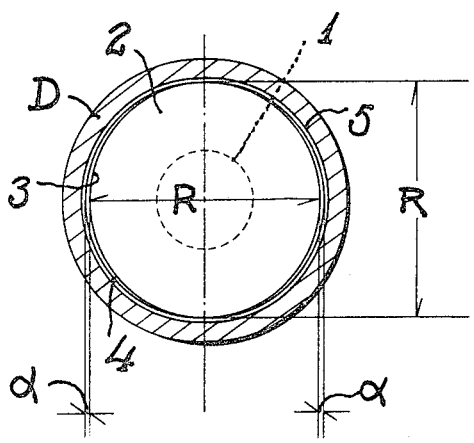
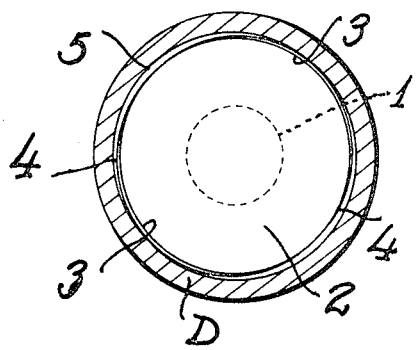

3,730,048

SCREW WITH A HEAD LOOKING LIKE A TRUE CIRCLE

The present invention pertains to a screw with a head looking like a true circle, which is characterized by forming the circumference of the top surface of the screw head into a true circle and also forming the periphery of the screw head which immediately follows said true circle of the top surface into an oval which consists of a short diameter being approximately the same as the diameter of the true circle of the top surface and a long diameter being slightly longer than said diameter of the true circle.

It has hitherto been an indispensable requisite that a screw has to be turned by a screw driver, a spanner, etc., so that in the case of a screw with a circular screw head, its top surface or its periphery must have a part to resist against the screw driver, spanner, etc. It is, therefore, regarded as a matter of common sense that the top surface must have a (+) shaped or (−) shaped groove for inserting the end of a screw driver or it must have an uneven part and that if such a thing is not provided on the top surface, an appropriate part to resist against a screw driver must be provided on the periphery of the screw head.

In the case of the screw made in accordance with the present invention, the circumference of the top surface of the screw head is formed into a true circle and the periphery of the screw head thru formed into a true circle and the periphery of the screw which immediately follows said true circle of the top surface is formed into an oval which consists of a short diameter being approximately the same as the diameter of the true circle of the top surface and a long diameter being very slightly longer than said diameter of the top surface. Due to such structure, those who see the true circle of the top surface of the screw head are hallucinated as if the oval periphery of the screw head which immediately follows said true circle, too, were a true circle. Thus, the whose screw head looks like a circular rivet.

The invention will now be described in connection with the accompanying drawings in which:

FIG. 1 is a plain view of a screw made in accordance with the present invention;

FIG. 2 is a side view of the screw when it is in an upright position;

FIG. 3 is a side view of the screw when it is in a horizontal position;

FIG. 4 is a side view partially broken away showing the engagement between the head of the screw and an oval hollow provided on the lower end of a screw driver;

FIG. 5 is a horizontal cross section of the oval hollow of the screw driver when it is put onto the head of the screw; and FIG. 6 and FIG. 7 are horizontal cross sections of the oval hollow of the screw driver showing how the screw moves in accordance with the turning of the screw driver.

A screw 1 has a screw head 2. The circumference 3 of the top surface of the screw head is formed into a true circle, and the periphery 4 of the screw head which immediately follows said true circle of the top surface is formed into an oval which consists of a short diameter being approximately the same as the diameter (R) of the true circle of the top surface and a long diameter being a slightly longer than said diameter (R) of top surface, i.e. (R) + 2α. As can be seen from the figures, the top edges of the head are then convexly chamfered.

In order to apply a screw of the abovementioned structure to a specific object, it is necessary to prepare a screw driver (D) with an oval hollow 5 at its end which matches with and is slightly larger than the oval periphery 4 of the screw head. When this oval hollow 5 is put onto the screw head 2 and is turned, the projected parts of the oval periphery 4 act as parts to resists against the screw driver (D) and turn in both directions. Thus, it becomes easy to screw and unscrew.

The abovementioned structure of the screw of the present invention has such advantage that, when the screw is screwed into an object and when the projected parts of the oval periphery of the screw head are pressed and fixed in an optional direction, the top surface of the screw head still looks like a true circle as if it were the top of a rivet, and thus the screw never gives unsightly appearance and yet it can be easily screwed and unscrewed.

What I claim is:

1. A screw comprising a first member having an external screw thread thereon and a second member forming the head of said screw, said head having the appearance of a true circle and comprising a first portion remote from said screw thread, said first portion comprising the top surface of said screw head and having a circular configuration; a second portion concentric with said first portion and positioned between said first portion and said screw thread, said second portion having an oval configuration, said oval portion having a minor axis and a major axis very slightly longer than said minor axis, said minor axis being substantially the same length as the diameter of said circular first portion, and the upper edge of said first and second portions being convexly chamfered with the chamfer of said first portion immediately following said top surface of the screw and blending into said second portion, whereby said first and second portions blend smoothly into each other throughout the periphery of said head, thereby forming a head structure which appears to be in the form of a true circle when looking down thereon.

* * * * *